(12) United States Patent
Claiborne et al.

(10) Patent No.: US 10,423,798 B2
(45) Date of Patent: Sep. 24, 2019

(54) MOBILE DEVICE AUTHENTICATED PRINT (71) Applicant: Hewlett-Packard Development Company, L.P., Houston, TX (US)

(72) Inventors: Steve Claiborne, Boise, ID (US); Chris Gunning, Boise, ID (US); Jim F Adams, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/079,640

(22) PCT Filed: Jun. 30, 2016

(86) PCT No.: PCT/US2016/040280
§ 371 (c)(1),
(2) Date: Aug. 24, 2018

(87) PCT Pub. No.: WO2018/004584
PCT Pub. Date: Jan. 4, 2018

(65) Prior Publication Data
US 2019/0042774 A1 Feb. 7, 2019

(51) Int. Cl.
G06F 3/12 (2006.01)
G06F 21/60 (2013.01)
G06K 15/02 (2006.01)
G06F 21/62 (2013.01)
H04W 4/80 (2018.01)
H04L 9/32 (2006.01)
G06K 15/00 (2006.01)

(52) U.S. Cl.
CPC .......... *G06F 21/608* (2013.01); *G06F 3/1222* (2013.01); *G06F 3/1238* (2013.01); *G06F 3/1267* (2013.01); *G06F 3/1285* (2013.01); *G06F 3/1292* (2013.01); *G06F 21/6218* (2013.01); *G06K 15/02* (2013.01); *H04L 9/3228* (2013.01); *H04W 4/80* (2018.02)

(58) Field of Classification Search
None
See application file for complete search history.

(56) References Cited

U.S. PATENT DOCUMENTS 6,751,732 B2   6/2004  Strobel et al.
7,576,883 B2   8/2009  Ragnet et al.
9,244,636 B1   1/2016  Khafizova
(Continued)

FOREIGN PATENT DOCUMENTS

CN    103218181 A    7/2013

OTHER PUBLICATIONS

Canon—Printing From Mobile Phone via Bluetooth Communication, 2016, http://ugp01.c-ij.com/ij/webmanual/~2 pages.

*Primary Examiner* — Dov Popovici
(74) *Attorney, Agent, or Firm* — HP Inc. Patent Department (57) ABSTRACT

An authenticated print session allows a mobile device to authenticate an encrypted file for printing at a print device sent by a base computer. The base computer authorizes the mobile device to release printing when in close proximity to the print device. The authenticated print session uses the mobile device to authenticate the owner of the encrypted file, and to authorize the release of the file at the print device over a non-secure communication channel.

20 Claims, 5 Drawing Sheets (56) References Cited

U.S. PATENT DOCUMENTS

2003/0044009 A1* 3/2003 Dathathraya ......... G06F 21/608
                                                    380/55
2014/0070002 A1   3/2014 Pineau et al.
2014/0185800 A1   7/2014 Fallon et al.
2014/0293314 A1  10/2014 Amarendra et al.

* cited by examiner

MOBILE DEVICE AUTHENTICATED PRINT

BACKGROUND

An ongoing trend is for businesses to share resources, such as computer servers, print devices, cubicles, and the like in order to reduce capital requirements, support, and maintenance. While computer servers can be remotely accessed and their output viewed on a local display, the same cannot be said for shared print devices which produce hardcopy output. Often times, this hardcopy output will have confidential information that should not be viewable by others without the proper clearance, permission, or other authorization. As such, employees with confidential information often require local personal printers and avoid using shared resources. Nonetheless, when cubicles are shared, even local printers may allow access to secured documents by unauthorized users.

BRIEF DESCRIPTION OF THE DRAWINGS

The disclosure is better understood with reference to the following drawings. The elements of the drawings are not necessarily to scale relative to each other. Rather, emphasis has instead been placed upon clearly illustrating the claimed subject matter. Furthermore, like reference numerals designate corresponding similar parts through the several views.

DETAILED DESCRIPTION

Disclosed herein is a technique that conveniently protects from unauthorized viewing hardcopy output at shared print devices. This technique along with its associated modified print devices, base computers, and mobile devices will help encourage all sizes of businesses to continue to share more resources as there is less of a requirement to print locally. Accordingly, print IT management within businesses will become more economically efficient while for the employee a simplified and enhanced user experience is gained along with improved security.

Print devices, such as printers, copiers, mopiers, fax machines, plotters, multifunction devices, and the like, continue to evolve as technology advances. One of the capabilities offered by today's print devices is the ability to store large amounts of data. Many print devices include built-in memory and/or storage (herein data storage) for storing data to be manipulated or printed by the print device. Data stored in data storage of a print device is received from a computer or other device in communication with the print device. Data is stored in separate files within the print device data storage. Some print devices may also store data on remote storage devices accessible via a network or other storage communication interface. Each file typically constitutes a single print job, although a print job may incorporate more than one file. Accordingly, a print job may include a single document or a set of documents that have been sent to the print device for hardcopy production. Thus, in some instances, a single print job may be defined, or shared, by multiple data files.

Many of the print jobs may include confidential information which should be kept secured from unauthorized viewing. This is particularly important with enterprise customers of print devices which have a tendency to to share print devices among several users in the same office space independent of their respective enterprise roles and/or security levels. Further, due to the amount of cyber-crime activity both by third party hackers and dishonest employees, it is also important that the print job be securely controlled from the point of transmission on a host base computer across a network (wired, wireless, or combination thereof) to the print device.

Figure 1:
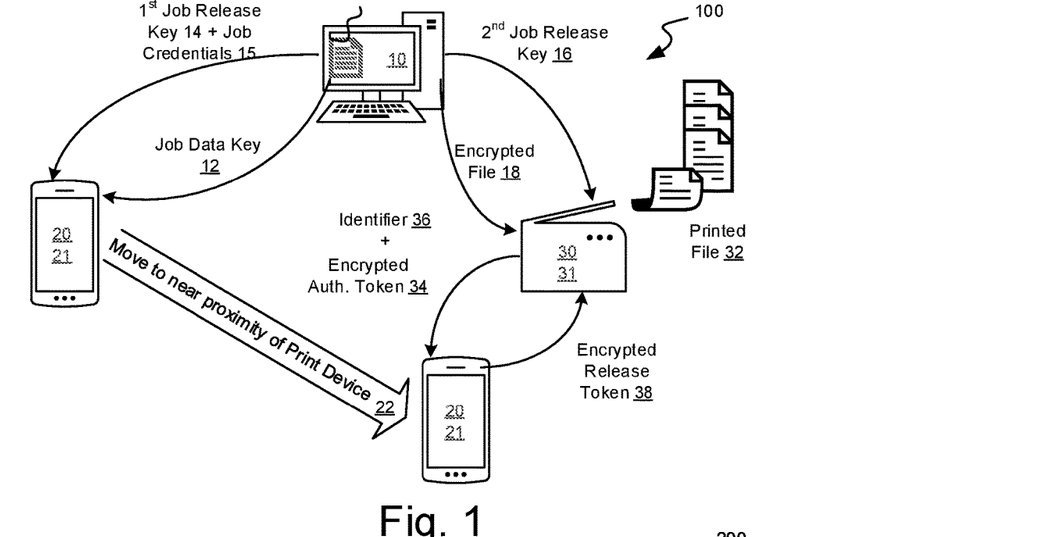
FIG. 1 is a pictorial diagram of an example mobile device authenticated print system.

FIG. 1 is a pictorial diagram of an example mobile device authenticated print system 100 that facilitates the secure printing of confidential secured documents in one or more files 11, such as into a hard copy printed file 32, using a simplified authentication process as described herein. This solution for secured printing utilizes a mobile device 20, such as a cell phone, smart phone, personal data assistant, watch, fitness tracker, tablet, phablet, notebook computer, or other transportable computing device to authenticate the owner of the files 11 that are to be treated as secured documents, and to authorize the hard copy release of the secured documents at the print device 30 in the form of printed file 32.

A print device 30 may be typically programmed to immediately print any data files sent to the print device 30. In other situations, such as described herein, a data file 11, such as a secured document that is encrypted, may be sent to the print device 30 for delayed printing until the owner of the data file is present. Until the owner arrives, the print device 30 stores the data file in data storage within or externally coupled to the print device 30 for an undetermined time. When the owner arrives with an enhanced mobile device for an authenticated print session, the print device confirms the ownership of the mobile device, the owner of the secured documents, and upon verification, receives a decryption key from the mobile device, decrypts the secured document, and authorizes the printing of the secured document to start. In some examples, print jobs sent to data storage reside in non-volatile memory and/or storage of a print device and may not be secure-erased following printing such as with secure specialized forms. In this situation, the print job is stored for on-demand printing that may occur multiple times by one or more users who may each be able to authorize the printing of the secure specialized form.

In this technique of mobile device authenticated printing, a mobile device 20 is used along with base computer 10 to 1) authenticate the owner of the secure documents stored as files 11 on base computer 10 and then 2) authorize the hard copy release of the secured documents at the print device 30 to create the printed file 32. These authentications are accomplished by using a lightweight token exchange between the mobile device 20 and the print device 30. For instance, the base computer 10 upon receiving a request to print a file 11 securely on the print device 30 proceeds with encrypting the file 11 with a job data key 12 to create encrypted file 18. The job data key 12 is securely sent to the mobile device 20. The encrypted file 18 is then sent to the print device 30. The base computer 10 sends a first job release key 14 to mobile device 20 and a second device key 16 to the print device 30. In some examples, the first job release key 14 and the second job release key 16 may be the same key or a simple transformation between the keys, such as with symmetric keys. Generation of symmetric keys are well known to those of skill in the art. In other examples, the first job release key 14 may be a public key of a public/private cryptographic key combo and the second job release key 16 a private key. In various examples, the first job release key 14 and the second job release key 16 may be sent over secured or unsecured channels. For instance, when second job release key 16 is a private key, it may be sent over a secured channel. The base computer 10 may have one or more wired or wireless networks in which to transmit the encrypted file 18 and the first job release key 14, second job release key 16, and job data key 12. In one example, the base computer 10 and the print device 30 are coupled with a network connection for transmitting the encrypted file 18 over a non-secure channel.

As noted, print device 30 may have data storage for storing print jobs, such as encrypted file 18, and may also typically include programming or other functionality that allows a user to view the file names of the print jobs stored in the print device 30 data storage. Names for the print jobs stored in the data storage of print device 30 may be randomly created, or they may include identifying indicia, such as a customized, or identifying, name. In some instances, additional information may be displayed with the file names of the print jobs. For instance, a user identification, or device identification, may be displayed to indicate the origin of the print job, be it a user name or a device name, such as for the mobile device 20. Priority assignments may also be indicated if a printing priority system is available to the print device 30.

Print job information displayed to a user of a print device 30 is often displayed as a print queue either at the print device 30 or on the mobile device 20 for those print jobs specific to the user. The print queue may list the print jobs stored in the print device data storage in the order that the print jobs are assigned to be printed. Sometimes, a user may promote a print job within the printing queue in order to print a stored print job sooner. A separate print job list for displaying indefinitely stored print jobs may also be accessed by a user on the mobile device 20 for selecting an indefinitely stored print job for printing such as encrypted file 18 which is not printed until authorized by the movement 22 of mobile device 20 into close proximity of print device 30.

Figure 2:
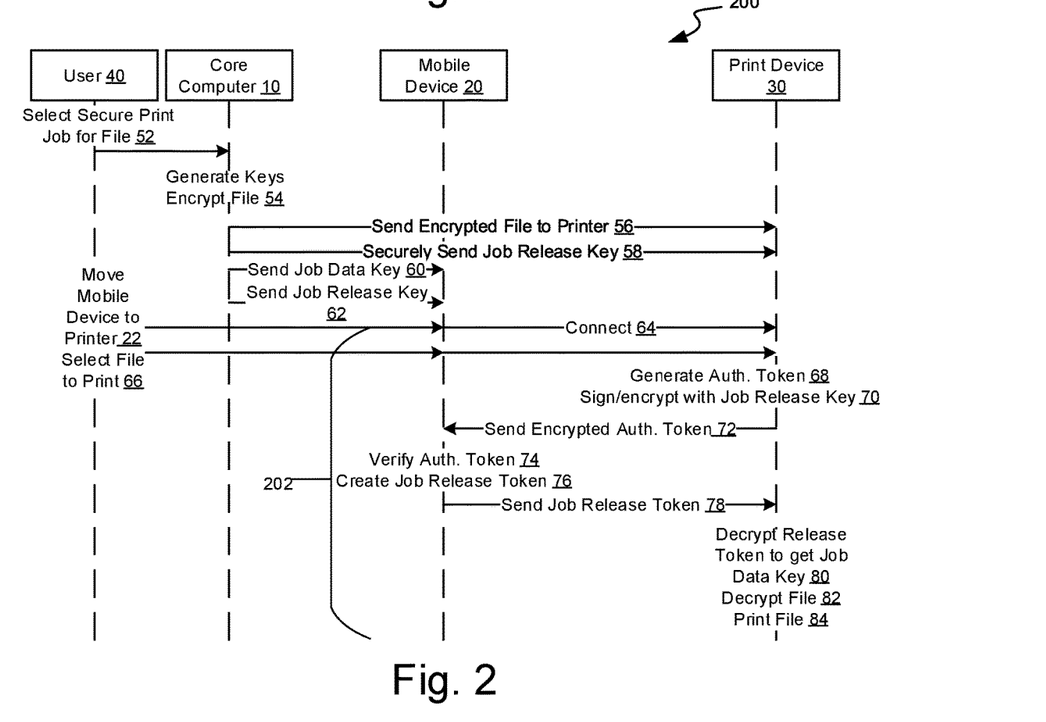
FIG. 2 is a schematic diagram of an example set of interactions of a mobile device authenticated print system.

For example, once the mobile device 20 is in close proximity, the mobile device 20 creates a communication session with the print device 30 and requests an authenticated print session 202 (see FIG. 2). The print device 30 sends its unique identifier 36 and an encrypted authorization token 34 signed by the second job release key 16. The mobile device 20 verifies the authorization token 34 using the first job release key 14. Based on the identifier 36, the mobile device presents a list of secured print jobs available at print device 30. The user of mobile device 20 selects one or more secured print job from the list. The mobile device 20 then creates an encrypted release token 38 containing the job data key 32 and the first job release key 14. The print device 30 then decrypts the encrypted release token 38 to obtain the job data key 12 to decrypt the encrypted file 18 and the first job release key 14. Once the first job release key 14 is verified that it conforms to the second job release key 16, the print device 30 proceeds to print the decrypted encrypted file 18 (the original file 11 of the secured document) to create the printed file 32 hard copy output.

FIG. 2 is a schematic diagram of an example authenticated print session 202 illustrating the interactions between a user 40, the core computer 10, the mobile device 20 and the print device 30 for the mobile device authenticated print system 100 of FIG. 1. In this example, the user 40 initiates the interaction by selecting 52 a secure print job for a file 11 on core computer 10. In response, the core computer 10 presents a list of mobile devices 20 to utilize for the authenticated print session 202. The list of mobile devices 20 may be from a set of mobile devices 20 previously certified as owned or authorized by the user such as through one or more pairing mechanisms (such as using a Bluetooth™ pairing protocol) to allow the base computer 10 and the mobile device 20 to securely share credentials, such as user ID, Job ID, Print Device ID, Mobile Device ID, etc. The user selects the appropriate mobile device 20 and also a designated print device 30 which supports the authenticated print session 202. The core computer 10 then proceeds to generate 54 first and second job release keys 14,16 for an encrypted file 18. In some instances, the job release keys may be a public/private pair and in other instances, they may be a symmetric key of the same value or simple transformation. In either instance, the core computer 10 non-securely sends the encrypted file 18 along with securely sending 58 second job release key 16 to print device 30. The core computer 10 also securely sends 60 the job data key 12 to the mobile device 20 along with sending 62 the first job release key 14 either securely or non-securely depending on the type of key. If a public release key, it may be sent non-securely but if a symmetric key it should be sent securely. At some future time, the user 40 moves 22 the mobile device 10 to close or near proximity of print device 30

When in proximity, the print device 30 and the mobile device 10 may communicate using one or more low bandwidth protocols such as Bluetooth™ Low Energy (BLE aka Bluetooth™ Smart), RFC, or other non-secure wireless link. BLE is a light-weight subset of classic Bluetooth™ 4.0 core specification. This wireless protocol allows for communication with modern mobile platforms, such as iOS™, Android™, Windows™ 10 Mobile, etc. found in most phones, phablets, tablets, and other mobile devices such as watches. In the BLE example, a general access profile (GAP) is used by the print device 30 to advertise an authenticated print session 202 to the mobile device 20. The mobile device 20 connects 64 to the print device 30 and acquires the unique identifier 36 of print device 30. Based on this identifier 36 the mobile device 20 recognizes that this particular print device 30 has store job(s) from the user 40 of mobile device 20. The mobile device 20 presents to the user 40 those stored jobs as a list that are available for release and which are specific to the mobile device 20 and the user 40. Upon selection, the mobile device 20 establishes an authenticated print session 202 that is in this example a BLE service that is provided by the print device 30 to allow the mobile device 20 to share the job credentials with the print device 30. Note that the BLE advertising and service sessions do not need to be a secure connection nor is there any need to create a Bluetooth™ pairing between the mobile device 20 and the print device 30. The authenticated print session 202 functionality may be implement on other non-secure wireless protocols besides BLE.

The print device 30 begins the authenticated print session 202 by generating 68 an authorization token 34. The authorization token 34 may include any random, pseudorandom, or semi-random initialization vector (IV) or a table based alphanumeric token that is used one or more times, though typically once to help prevent "man in the middle" replay attempts to acquire hard copy of the secured document. In one example, the authorization token 34 is a number used only once (such as a nonce). In other examples, the authorization token is a random generated alpha-numeric code. The print device 30 signs or encrypts 70 the authorization token 34 with the second job release key 16 and then sends 72 the signed//encrypted authentication token 34 to the mobile device 20. The authentication token 34 is then verified 74 at the mobile device 20 by using the first job release key 14 to check the signature or decrypt the authorization token 34 and recover the original authorization token 34. The mobile device 20 then creates 72 a release token 38 by encrypting using the first job release key 14 the authentication token 34, the job data key 12 and any other job credential information such as user ID, Job ID, Print Device ID, Mobile Device ID, etc. for the job to be printed. The release token 38 is sent 78 to the print device 30 which upon receipt then decrypts 80 the release token 38 using the second job release key 16 to obtain the authentication token 34. In some implementations, the job data key 12 may be a PIN or passphrase and the print device 30 allows the PIN or passphrase to be alternatively entered on a keypad on the print device 30. Upon verification and confirmation that the authentication token is correct, the print device 30 decrypts 82 the encrypted file 18 and proceeds to print 84 the decrypted encrypted file 18 (the original file 11) as printed file 32.

In a first example, the authentication token 34 is signed with the second job release key 16 at the print device to create a signed authentication token 34 wherein the second job release key 16 is a private job release key. In a second example, the print device 30 generates a random initialization vector (IV) along with the authentication token 34 and the authentication token 34 is encrypted with the second job release key 16 that is, a symmetric key, and prepended with the unencrypted IV to create the encrypted authorization token 34.

In the first example, the mobile device 20 receives the signed authorization token 34 from the print device 30 and verifies the authentication token with the first job release key 14 which is a public job release key. In the second example, the mobile device 20 receives the encrypted authentication token 34 from print device 30 and decrypts the encrypted authorization token 34 using the unencrypted IV with the first job release key 14 which is the same symmetric key or slightly transformed symmetric key as the second job release key 16.

Figure 3A:
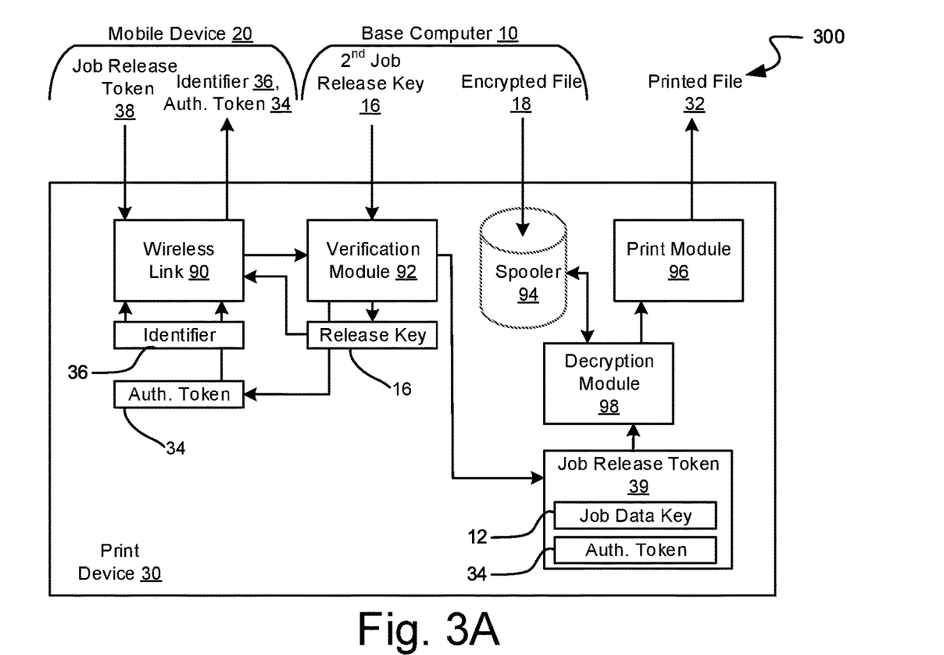
FIG. 3A is a functional block diagram of an example print device.

FIG. 3A is a functional block diagram 300 of an example print device 30 that includes a spooler 94 to receive an encrypted file 18 from a base computer 10. A verification module 92 is used to receive a job release key, such as second job release key 16, from the base computer 10 for the encrypted file 18. The print device 30 also includes a wireless link 90 to couple with a mobile device 20 upon proximity between the mobile device 20 and the print device 30. In one example, the wireless link 90 is a non-secured wireless link. In another example, the wireless link 90 is a non-secure low bandwidth wireless link, such as a Bluetooth™ Low Energy link. The wireless link 90 establishes an authenticated print session (202, FIG. 2) with an identifier 36 sent to the mobile device. A verification module 92 creates an authorization token 34 encrypted with the job release key 16 which is sent to the mobile device 20 by the wireless link 90. In some implementations, the authorization token 34 is invalidated by the verification module 92 after only one use.

The print module 30 receives from the mobile device 20 via the wireless link 90 a job release token 38 encrypted by the first job release key 14. The job release token 38 is processed by the verification module 92 to verify ownership of the mobile device 20 and recover the job data key 12 using a decrypted authorization token 34. In some implementations, the job data key 12 is a PIN or passphrase and the print device 30 allows the PIN or passphrase to be alternatively entered on a keypad on the print device 30. A decryption module 98 is used to decrypt the job release token 38 with the second job release key 16 to create a decrypted job release token 39 that contains the recovered job data key 12 and authentication token 34. The decryption module 98 also decrypts the encrypted file 18 with the job data key 12 before producing hard copy output. A print module 96 is used to print or otherwise make a hard copy of the decrypted encrypted file 18 (the original file 11 on base computer 10) if the decrypted authorization token 34 matches the authorization token 34 sent to the mobile device 20 over the wireless link 90.

Figure 3B:
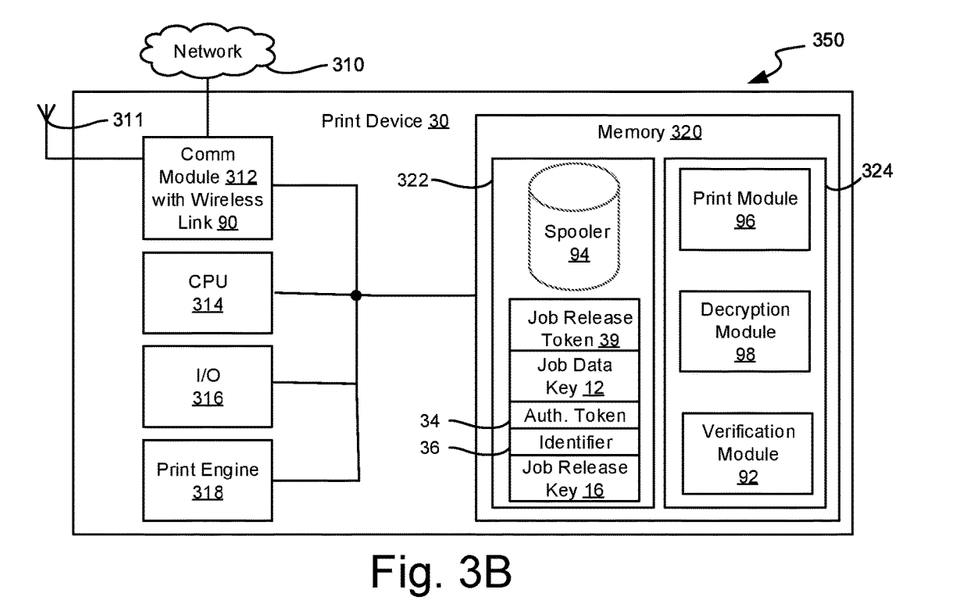
FIG. 3B is a component block diagram of an example print device.

FIG. 3B is a component block diagram 350 of an example print device 30. The print device 30 includes a central processing unit (CPU) 314 coupled to a memory 320. CPU 314 (and likewise CPU 510 in FIG. 5, CPU 710 in FIG. 7) may include one or more processors, such as x86, x64, Power PC, ARM, and other CPU architectures known to those of skill in the art. The one or more processors may each have one or more operable cores in which to execute instruction from non-transitory computer readable memory. Memory 320 may include any type of memory commonly used with print devices 30. For instance, memory 320 (and likewise memory 512 of FIG. 5 and memory 712 of FIG. 7) may be read-only memory (ROM), random-access memory (RAM), flash memory, dynamic RAM (DRAM), static RAM (SRAM) memory, or the like. Memory 320 may also include memory located in other components such as the CPU 314, various levels of cache, display memory, and various direct memory accesses peripheral devices.

CPU 314 is further coupled to a communication (comm) module 312 that includes wireless link 90 coupled to an antenna 311 and may also include other wired, optical, or wireless network 310 interfaces, such as Ethernet™, WiFi™, WiDi™, Firewire™, Lightning Bolt™, Display Port™, HDMI™, various IEEE 80211™ variants, Thunderbolt™, WiMax™, and the like. The networks may include both secure and non-secure channels in which to communicate to the mobile device 20 and the base computer 10. Typically, the secure channels will require more overhead than non-secure channels and therefore may be slower and thus less desirable at times than a non-secure channel. However, the secure channels may provide protection from hackers, deviants, foreign agents, and other undesirable or unscrupulous persons or programmable software bots that try to monitor and/or steal data or attempt to insert malware, viruses, and/or Trojans.

An Input/Output (I/O) interface 316 (and likewise I/O module 518 in FIG. 5 and I/O module 718 in FIG. 7) may be used to connect to base computer 10 locally such as with a USB™ interface. Also, the I/O interface may have one or more human user device (HUD) interfaces that may also connect to a small keyboard, display, touch-based display or other that allow a user 40 to view and select stored print jobs and in some instances allow for manual entry of the job data key 12.

Data 322, such as print jobs, are commonly stored in memory 320 in a spooler 94 until print device 30 receives a request to print a hard copy of the print job, such as encrypted file 18. When the mobile device 20 is moved into proximity of print device 30 and the authenticated print session 202 (FIG. 2) establishes a valid print job for printing, a print module 96 retrieves the print job (the decrypted encrypted file 18 or original secured document of file 11 (FIG. 1)) from memory 320 and causes a hard copy of the print job to be printed by print device 30 as printed file 32 using print engine 318. In various implementations, the print engine 318 may be a fluid jet print engine, a laser jet print engine, a wax based print engine, or other marking engine known to those of skill in the art.

Spooler 94 may include any type of storage device capable of storing or retrieving data 322 and may be internal or external to print device 30. For instance, spooler 94 may include a hard drive, an optical drive, a zip drive, a compact disc drive, a digital video disk drive, or other similar device for storing and retrieving data 322 to fixed or readable media. Data 322, such as forms or other print jobs, may be stored on the spooler 94 instead of, or in addition to, being stored in memory 320. Similarly, a user 40 may import a print job into memory 320 from a storage media using storage device interface (not shown) such as USB, memory stick, microSD, compact flash, and the like. Other data 322 may include one or more job release tokens 39 as well as a recovered job data keys 12, first and second job release keys 14, 16, authentication tokens 34, and the print device identifier 36.

The memory 320 may also include software 324 stored as computer executable instructions in tangible non-transitory computer readable memory. Such software 324 may be organized in one or more modules, object, or sub-routines, such as print module 96, decryption module 98 and verification module 92 as just one example.

Figure 4:
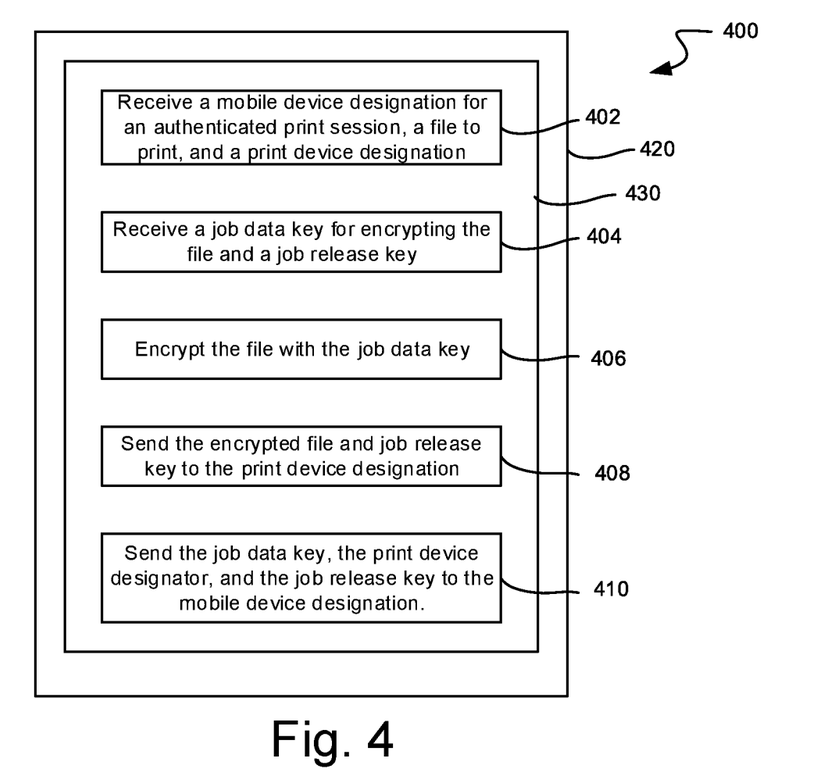
FIG. 4 is a block diagram of an example computer readable medium with instructions for a base computer.

FIG. 4 is a block diagram 400 of an example non-transitory computer readable medium (CRM) 420 having computer executable instructions 430 for an example base computer 10. The instruction 430 cause a processor in the base computer 10 to receive in block 402 a mobile device designation 21 for an authenticated print session 202, a file to print, and a print device designation 31. In block 404, the base computer 10 receives a job data key 12 for encrypting the file 11, into a secure document or encrypted file 18, and a job release key, which may include a first job release key 14 and a second job release key 16 that may be the same or different but related for locking and unlocking or signing and confirming purposes. In some implementations, the base computer 10 is paired securely with the mobile device 20, such as with Bluetooth™ pairing, and the mobile device 20 is not paired securely with the print device 30 but may be linked with Bluetooth™ BLE.

The job data key 12 may be a personal Identification number (PIN) or passphrase which may be input by the user 40 or randomly generated by the base computer 10 to improve security and eliminate the need for the user 40 to have to enter one.

In one example, the first and second job release keys 14, 16 are a symmetric key which is the same for the first job release key 14 and the second job release key 16. In another example a set of job release keys is a public/private key combo wherein the public job release key 14 is to be sent to a mobile device 20 and the private job release key 16 is to be sent to a print device 30. Accordingly, the instructions 430 to receive the set of job release key 14, 16 in block 404 may include to receive a public job release key 14 and a private job release key 16 and wherein the instructions in block 404 are further to cause the processor to securely send the private job release key 16 to the print device 30 and to non-securely send the public job release key 14 to the mobile device 20.

In block 406, the base computer 10 encrypts the file 11 with the job data key 12 to create the encrypted file 18. In block 408, the base computer 10 sends the encrypted file 18 and the job release key 16 to the designated print device 30. If the job release key 16 is a private job release key 16, then the job release key 16 is transmitted over a secure link to the print device 30 such as with a secure network session. In block 410, the job data key 12, the designation of the print device 30, and the job release key 14 are sent to the designated mobile device 20. In some implementations, the job data key 12 and the job release key 14 are sent to the mobile device 20 via a secure communication channel. A secure communication channel is a way of transferring data that is resistant to overhearing and tampering. For instance, a secure message may be sent with several different techniques known to those of skill in the art and include but not limited to: secured web interface, S/MIME ((Secure/Multipurpose Internet Mail Extensions) or PGP (Pretty Good Privacy) encrypted communication or TLS (Transport Layer Security)/SSL (Secure Sockets Layer) secured connections. In one example, using Bluetooth™ pairing between the base computer 10 and the mobile device 20, a secure link may be established to allow for the secured sharing of the job data key 12 and the first job release key 14.

Figure 5:
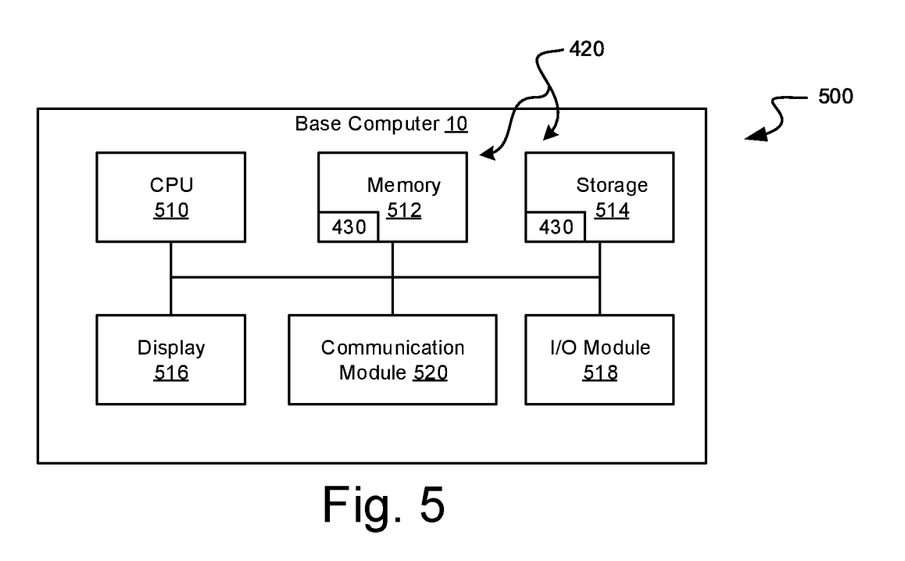
FIG. 5 is a block diagram of an example base computer used to execute the instructions of the computer readable medium of FIG. 4.

FIG. 5 is a block diagram 500 of an example base computer 10 used to execute the instructions 430 of the computer readable medium 420 of FIG. 4. The computer readable medium (CRM) 420 may include a memory 512, such as described for memory 320 of FIG. 3B, coupled to CPU 510. CPU 510 may include one or more processors, such as described for CPU 314 of FIG. 3B. The one or more processors may each have one or more operable cores in which to execute the instructions 430 from CRM 420. The CRM 420 may also include a storage device 514 also coupled to CPU 510. The storage device 514 may be one or more typically non-volatile storage devices and may include magnetic and optical forms of disk or tape memory, solid state memory and like which are well known to those of skill in the art. The storage device 514 may couple to the CPU 510 in one or more forms of computer interfaces such as Ethernet™, Firewire™, SCSI™, USB™, ATA™, SATA™ and the like. The CPU 510 may transfer the instructions 430 from storage 514 to memory 512 and then read the instructions 430 from the memory 512 during an authenticated print session 202. Accordingly, the instructions 430 may reside on memory 512 or storage device 514 or both or even within CPU 510. The CPU 510 is also generally coupled to a display 516 to allow a user 40 to view options and make selections using one or more human interface devices coupled to I/O module 518. A communications module 520 typically includes high speed, high capacity interfaces such as Ethernet™, WiFi™, HDMI™, Thunderbolt™, DisplayPort™, and the like. The communication module 520 may also include low bandwidth, low capacity communication channels such as Bluetooth™, RFC, infrared, and the like. These low bandwidth channels may include both secure and non-secure options depending on particular implementations.

Figure 6:
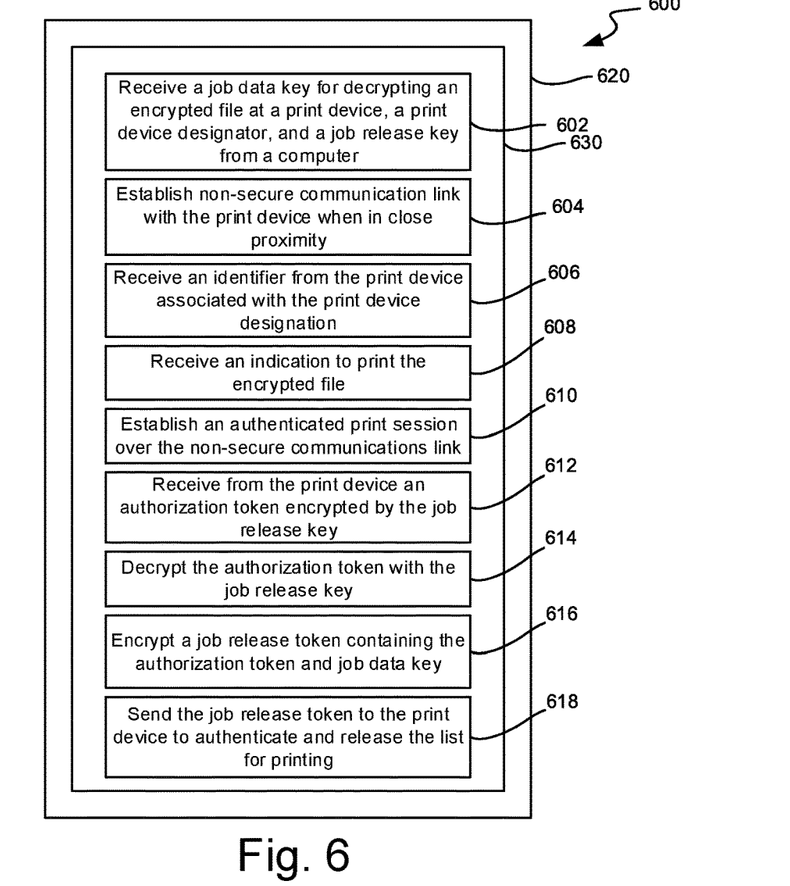
FIG. 6 is a block diagram of an example computer readable medium with instructions for a mobile device.

FIG. 6 is a block diagram 600 of an example tangible and non-transitory computer readable medium (CRM) 620 with computer executable instructions 630 for a mobile device 20 used in an authenticated print session 202. The CRM 620 includes instructions 630 that when executed by a processor on a mobile device 20 cause the processor to perform one or more operations. For instance, in block 602, the instructions 630 allow the mobile device 20 to receive a job data key 12 for decrypting an encrypted file 18 at a print device 30, a print device designator, and a job release key 14 from a base computer 10. Typically, the job data key 12 is received over a secured communication channel from the base computer 10. If the job release key 14 is a symmetric key, the job release key 14 is typically sent over a secured communications channel from the base computer 10. As the user 40 then transports or otherwise moves the mobile device 20 towards the designated print device 30, in block 604, the instructions 630 establish a non-secure communication link with the print device 30 when in close proximity and in block 606 receive an identifier 36 from the print device 30 associated with the print device designation 31.

In block 608, the instructions 630 allow the mobile device 20 to receive an indication from user 40 to print the encrypted file 18. Then in block 610 the mobile device 20 establishes an authenticated print session 202 over the non-secure communications link. Over the non-secure communications link, the mobile device 20 receives from the print device 30 an authorization token 34 encrypted by the job release key 16 of the print device 30. In block 612, the mobile device 20 decrypts the encrypted authorization token 34 with the job release key 14 of the mobile device 20. The mobile device 20 then proceeds in block 614 to create an encrypted job release token 38 containing the authorization token 34 and the job data key 12. The mobile device 20 then sends the job release token 38 to the print device 30 to authenticate and release the encrypted file 18 for printing a hard copy output as printed file 32.

Figure 7:
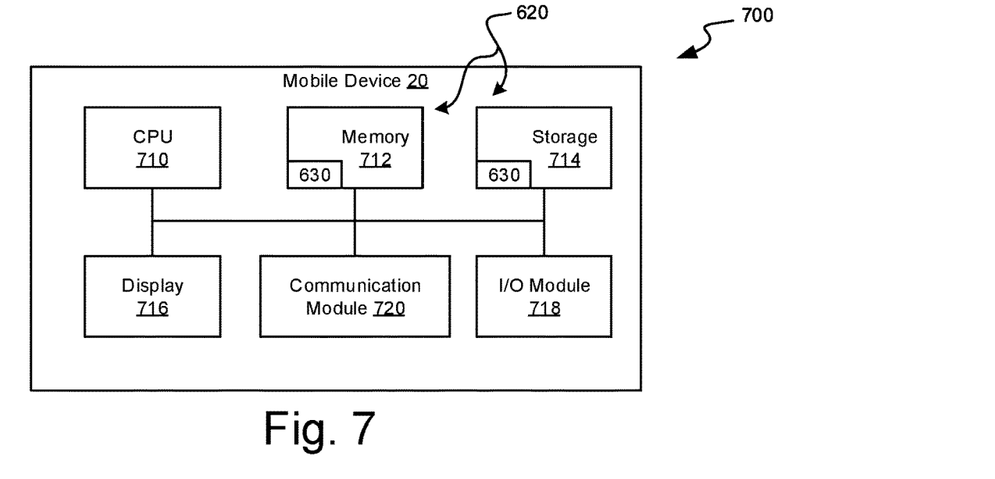
FIG. 7 is a block diagram of an example mobile device used to execute the instructions of the computer readable medium of FIG. 6.

FIG. 7 is a block diagram 700 of an example mobile device 20 used to execute the instructions 630 of the computer readable medium 620 of FIG. 6. The CPU 710 is similar to the CPU 510 of FIG. 5 but is typically of a lower power wattage such as by operating at a lower frequency but not necessarily so. They may be of the same or different architectures and may include the same or different number of core processors with same or differing amount of threads to process the instructions 430, 630. The CPU 710 in mobile device 20 is coupled to memory 712 and storage 714 which both are computer readable mediums that can store instructions 630 for processing by one or more processors in CPU 710. The mobile device 20 may also include a display 716, typically a touch screen, an LCD (liquid crystal display) screen, an organic light emitting diode screen, or other type of active or passive screen, such as an e-ink or dielectric screen. The mobile device 20 may also include an Input/Output (I/O) module 718 to allow for human interface interactions such as with touch, biometrics, a pen interface, a haptic interface, a depth perception interface, and the like and includes typical personal computer human interface devices such as keyboards, mice, headsets, speakers, headphones, and the like. The CPU 710 is also coupled to a communications module 720 that includes a wireless link 90 which may be implemented with one or more wireless standards such as described earlier. The communications module 720 may also include remote wireless cellular or satellite channels for enabling both voice and data communications to other devices, such as base computer 10 and print device 30 when typical local wireless solutions are not available. The memory 712 may be similar to any of the various types as described for memory 512 of the base computer 10 in FIG. 5. The storage device 714 may be similar to any of the various storage types described for storage device 514 of FIG. 5.

Figure 8:
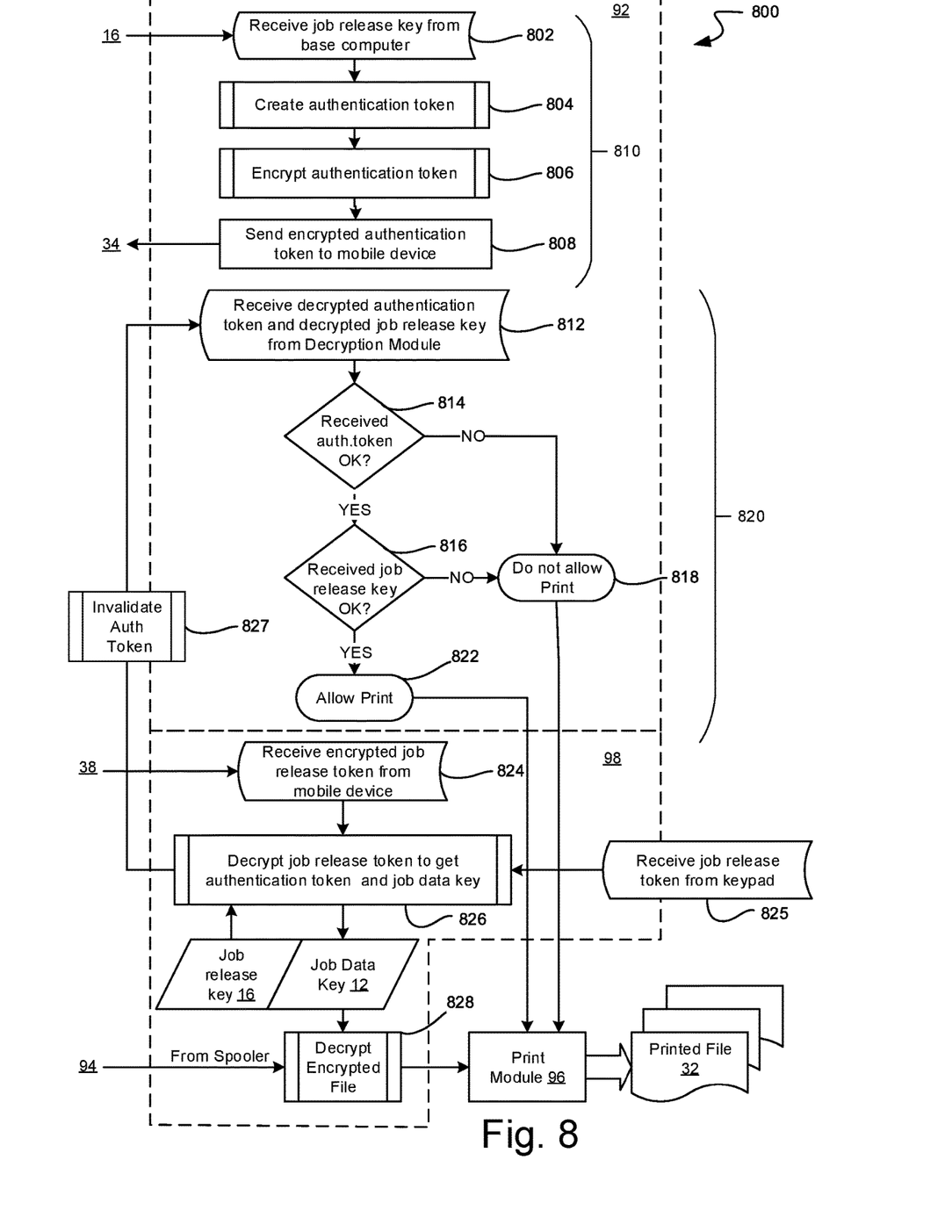
FIG. 8 is a flow chart of various operations performed in a mobile device authenticated print system.

FIG. 8 is a flow chart 800 of various operations performed in an authenticated print session 202 in print device 30 within a mobile device authenticated print system 100 (FIG. 1) that includes mobile device 20 and base computer 10. The operations shown may be performed as a method on print device 30 or encodes as computer executable instructions on a non-transitory computer readable medium in the print device 30. Referring back to FIG. 3B, the print device 30 has a memory 320 that is coupled to a CPU 314 that may include one or more processors having one or more cores with one or more threads for executing the instructions 324. The instructions 324 may include one or more modules organized as sub-routines, objects, or other software constructs to implement the desired functionality.

For instance, the verification module 92 may include multiple modules such as first module 810 and second module 820 to perform the various verification functions. First module 810 includes a function in block 802 to receive a second job release key 16 from the base computer 10. In block 804 and authentication token 34 is created by the print device 30 and encrypted in block 806 by the second job release key 16. The print device 30 in block 806 then sends the encrypted authentication token 34 to a mobile device 20.

The second module 820 of the verification module 92 includes a function in block 812 to receive a decrypted authentication token and decrypted first job release key 14 from the decryption module 98. Before sending the decrypted authentication token and the decrypted first job release key 14, the decryption module 98 in block 824 first receives an encrypted job release token 38 from the mobile device 20 and in block 826 decrypts the job release token 38 with job release key 16 to get the authentication token 34 and the job data key 12. In some instances, the decryption module 98 or the verification module 92 may invalidate the authorization token 34 in block 827 after it has been used once to prevent man in the middle type attacks to recreated any hard copy output. Also, some implementations may allow a user 40 in block 825 to enter the authorization token 34 from a keypad and thus the decryption module 98 may receive the authorization token 34 from a keypad through I/O 316 (FIG. 3B).

The second module 820 upon receipt of the authentication token 34 and the first job release key 14 in block 814 verifies that the received authentication token 34 is the same as the one sent to the mobile device or not. If not, then printing will not be allowed in block 818. If the received authentication token 34 is OK, then in block 816 the received first job release key 14 is verified to see if it matches appropriately (the same or part of a public/private pair duo) with the print device 30 second job release key 16. If not verified as OK, then the print device 30 in block 818 does not allow printing. If verified OK in block 816 then in block 822 printing is allowed. The job data key 12 is then used by the decryption module 98 to decrypt the encrypted file 18 that is taken from the spooler 94 and transferred to the print module 96 to make the hard copy output for printed file 32 based on the status of blocks 822 and 818.

In summary, the mobile device authenticated print techniques disclosed herein allow for an improved printing experience for users 40. A user 40 no longer has to enter a PIN and/or passphrase at the print device 30 but in some implementation may retain the option to do so. By simply moving one's mobile device 20, such as a smart phone to close proximity of the print device 30, the job retrieval and print operation can be automated as the user 40 may be recognized automatically at the print device 30. The user 40 also benefits by having improved security as the PIN/ passphrase may be randomly generated rather than having to be supplied by the user 40. The print job may be securely transmitted over either secure or non-secure communication channels as the secure document is an encrypted file 18 when stored locally or remotely at/from the print device 30. Any required print job credentials are encrypted when transmitted to the print device 30 and the mobile device 20. These credentials allow for the positive identification of the print job customer and their immediate proximity to the print device 30 prior to releasing the print job for hard copy output, thus minimizing the risk of third party viewing of the printed file 32. Once the print job customer, e.g. the mobile device user, moves away from the print device 30, the customer is automatically logged off the authenticated print session 202 with the print device 30. This technique of mobile device authenticated print allows businesses of various sizes to share hard copy output resources to reduce capital requirements, IT support, and reduce maintenance overhead while also protecting confidential information that should not be viewable by others without the proper clearance, permission, or other authorization.

While the claimed subject matter has been particularly shown and described with reference to the foregoing examples, those skilled in the art will understand that many variations may be made therein without departing from the intended scope of subject matter in the claims which follow. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A print device, comprising:
   a spooler to receive an encrypted file;
   a verification module to receive a job release key for the encrypted file;
   a wireless link to:
      couple with a mobile device upon proximity,
      establish an authenticated print session in which an authorization token encrypted with the job release key is sent to the mobile device by the verification module, and
      receive from the mobile device a job release token encrypted by the job release key, the job release token processed by the verification module to verify and recover a job data key and a decrypted authorization token;
   a decryption module to decrypt the job release token with the job release key and further to decrypt the encrypted file with the job data key; and
   a print module to print the file if the decrypted authorization token matches the authorization token sent to the mobile device, wherein each of the verification module, decryption module and print module include associated circuitry.

2. The print device of claim 1 wherein the mobile device is not secured to the print device over the wireless link and the verification module is to, via the wireless link, communicate the authorization token to the mobile device.

3. The print device of claim 2 wherein the wireless link is a non-secure low-bandwidth communication link.

4. The print device of claim 2 wherein the wireless link is a non-secure Bluetooth Low Energy link.

5. The print device of claim 1 wherein the verification module is to invalidate the authorization token after one use.

6. The print device of claim 1 wherein the job data key is a PIN or passphrase and the print device allows the PIN or passphrase to be alternatively entered on a keypad on the print device.

7. The print device of claim 1 wherein the job release key is a symmetric key and the job data key is encrypted with the job release key and an initialization vector.

8. The print device of claim 1 wherein the job release key is received via a secure communication channel.

9. A non-transitory computer readable medium, comprising instructions that when executed by a processor in a computer cause the processor to:
   receive a mobile device designation for an authenticated print session, a file to print, and a print device designation;
   receive a job data key for encrypting the file, and a job release key;
   encrypt the file with the job data key;
   send the encrypted file and job release key to the print device designation; and
   send the job data key, the print device designator, and the job release key to the mobile device designation.

10. The computer readable medium of claim 9 wherein the job data key and the job release key are sent to the mobile device via a secure communication channel.

11. The computer readable medium of claim 9 wherein the computer is paired securely with the mobile device and the mobile device is not paired securely with the print device, wherein the instructions further cause the processor to generate the job release key.

12. The computer readable medium of claim 9 wherein the instructions to receive a job release key includes to receive a public job release key and a private job release key and wherein the instructions are further to cause the processor to securely send the private job release key to the print device and to non-securely send the public job release key to the mobile device.

13. The computer readable medium of claim 9, wherein the instructions further cause the processor to generate the job release key, the job release key being random or pseudo random.

14. The computer readable medium of claim 9, wherein the instructions further cause the processor to generate the job release key, wherein the job release key is a symmetric key sent to the print device designation and the mobile device designation.

15. The computer readable medium of claim 9, wherein the instructions further cause the processor to generate the job release key, the job release key is a private key sent to the print device designation and a public key sent to the mobile device designation.

16. A non-transitory computer readable medium, comprising instructions that when executed by a processor on a mobile device cause the processor to:
   receive a job data key for decrypting an encrypted file at a print device, a print device designator, and a job release key from a computer;

establish a non-secure communication link with the print device when in close proximity;
receive an identifier from the print device associated with the print device designation;
receive an indication to print the encrypted file;
establish an authenticated print session over the non-secure communications link;
receive from the print device an authorization token encrypted by the job release key;
decrypt the authorization token with the job release key;
encrypt a job release token containing the authorization token and job data key; and
send the job release token to the print device to authenticate and release the encrypted file for printing.

17. The computer readable medium of claim 16 wherein the job data key is received over a secured communication channel from the computer.

18. The computer readable medium of claim 16 wherein the job release key is sent over a secured communications channel from the computer.

19. The computer readable medium of claim 16 wherein the instructions to encrypt a job release token include instructions to encrypt job credential information including a mobile device ID with the job release key.

20. The computer readable medium of claim 16 wherein the authorization token is invalidated after one use.

* * * * *